US008426729B2

(12) United States Patent
Hiller et al.

(10) Patent No.: US 8,426,729 B2
(45) Date of Patent: Apr. 23, 2013

(54) WILDLIFE GUARD ASSEMBLIES, MODULAR SYSTEMS AND METHODS FOR USING THE SAME

(75) Inventors: Laura J. Hiller, Cary, NC (US); Luis O. Puigcerver, Cary, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 579 days.

(21) Appl. No.: 12/576,063

(22) Filed: Oct. 8, 2009

(65) Prior Publication Data

US 2011/0083896 A1 Apr. 14, 2011

(51) Int. Cl.
| | |
|---|---|
| H02B 1/06 | (2006.01) |
| H02G 1/02 | (2006.01) |
| H02G 7/00 | (2006.01) |
| F16B 33/00 | (2006.01) |
| F16B 37/00 | (2006.01) |
| H01B 17/14 | (2006.01) |

(52) U.S. Cl.
USPC ...................................... 174/5 R; 174/138 R

(58) Field of Classification Search .................. 174/5 R, 174/138 F, 138 R, 139, 140 H, 138 E; D30/199; 250/443.1; 374/186; 49/58; 52/101; 361/232
See application file for complete search history.

(56) References Cited

U.S. PATENT DOCUMENTS

| 4,453,353 | A | * | 6/1984 | Killop et al. ................... 174/5 R |
| 4,845,307 | A | | 7/1989 | Cumming et al. |
| 5,308,923 | A | * | 5/1994 | Puigcerver et al. ............. 174/87 |
| 6,005,196 | A | | 12/1999 | Spillyards |
| D435,055 | S | | 12/2000 | Puigcerver et al. |
| 6,248,956 | B1 | | 6/2001 | Cook et al. |
| 6,255,597 | B1 | | 7/2001 | Bowling et al. |
| 6,291,774 | B1 | | 9/2001 | Williams |
| 6,303,870 | B1 | * | 10/2001 | Nazaryan et al. ............. 174/172 |
| 6,359,228 | B1 | * | 3/2002 | Strause et al. ................... 174/91 |
| 6,486,785 | B1 | | 11/2002 | Hoth |
| 6,770,809 | B1 | | 8/2004 | De France |
| 6,995,313 | B1 | | 2/2006 | Barnett et al. |
| 7,297,869 | B2 | | 11/2007 | Hiller et al. |
| D595,804 | S | | 7/2009 | Tollefson et al. |
| 7,622,668 | B1 | * | 11/2009 | Tollefson et al. .......... 174/138 F |

FOREIGN PATENT DOCUMENTS

| EP | 1 052 657 A2 | 11/2000 |
| WO | WO 01/63625 A2 | 8/2001 |

OTHER PUBLICATIONS

"BCAC Bushing Connection Animal Cover," Tyco Electronics PII-55169, Rev AA, PCN F03268-000, Sep. 11, 2001, 6 pages.
"BCAC 8D/14-01, BCAC 7D/10-01 Bushing Cover," Tyco Electronics PCN D 19792-000, Jul. 15, 2008, 4 pages.

(Continued)

Primary Examiner — Timothy Thompson
Assistant Examiner — Roshn Varghese
(74) Attorney, Agent, or Firm — Myers Bigel Sibley & Sajovec, PA

(57) ABSTRACT

A wildlife guard assembly for an electrical insulator body includes at least three guard members serially connected to one another such that at least one of the guard members is moveable relative to the others. Each of the guard members has a respective shell body. The guard members are selectively movable between an open position, wherein the guard members are configured to receive the insulator body, and a closed position, wherein the shell bodies of the at least three guard members collectively form an enclosure defining a chamber to receive the insulator body such that at least a portion of the insulator body is enclosed by the enclosure.

18 Claims, 7 Drawing Sheets

OTHER PUBLICATIONS

"Energy Division—BCAC Bushing Connection Animal Cover," Tyco Electronics, Mar. 2009, 2 pages.

"Insulation Enhancement—Substation Asset Protection for Wildlife—BCAC-5D/8," http://energy.tycoelectronics.com/index.asp?act=page&pag_id=2&prl_id=5&pls_id=29&p . . . Aug. 31, 2009.

"Insulation Enhancement—Substation Asset Protection for Wildlife—BCAC-8D/14," http://energy.tycoelectronics.com/index.asp?act=page&pag_id=2&prl_id=5&pls_id=29&p . . . Aug. 31, 2009.

"Therm-A Guard® Wildlife Protector," http://www.therm-a-guard.com/indexc.html, Aug. 31, 2009.

Notification of Transmittal of the International Search Report and the Written Opinion of the International Searching Authority, or the Declaration in corresponding PCT Application No. PCT/US2010/047435 mailed Mar. 23, 2011, 9 pages.

Notification Concerning Transmittal of International Preliminary Report on Patentability in corresponding PCT Application No. PCT/US2010/047435 mailed Apr. 19, 2012, 6 pages.

* cited by examiner

WILDLIFE GUARD ASSEMBLIES, MODULAR SYSTEMS AND METHODS FOR USING THE SAME

FIELD OF THE INVENTION

The present invention relates to protective guards and, more particularly, to wildlife guards for power distribution lines and associated insulators.

BACKGROUND OF THE INVENTION

Electrical equipment, such as power transmission lines, insulators, surge arrestors, switchgear and transformers (e.g., operating at voltages in excess of 1 kV and particularly in excess of 10 kV, such voltages hereinafter being referred to as "high voltage"), often have parts thereof or parts associated therewith that are not insulated from the surrounding air. Thus, an exposed portion of such equipment can be at high voltage and be longitudinally separated from another portion at low voltage, for example at earth potential. The exposed high voltage portion may be physically supported by an insulator, for example when an overhead power line is mounted on an insulator that spaces it from a supporting tower that is itself at earth potential, or for example when a high voltage cable is terminated at a bushing or switchgear whose metal housing is at earth potential. In such instances outdoors, larger wildlife such as squirrels and birds with large wingspans may be big enough to form a direct bridge (i.e., an electrical short circuit) between the high voltage equipment and earth potential, with serious, usually fatal, consequences for themselves and often with serious consequences for the electrical equipment and the supply of electrical power—usually at least a fuse is actuated or a circuit breaker triggered such that the power supply is interrupted.

One known solution to the foregoing problem is to install a wildlife guard that may be referred to as a "squirrel guard". Typically, a wildlife guard includes one or more parts forming a disk with an aperture. The wildlife guard is mounted on an insulator (e.g., between sheds) such that the disc extends radially outwardly from the insulator beyond the sheds. The wildlife guard substantially increases the distance from earth potential to the high voltage equipment so that wildlife are prevented from simultaneously making contact with each of, and thereby bridging, earth potential and the high voltage equipment. Another type of wildlife guard includes a pair of pivotally connected cover portions that, when closed, form a hollow body that enclose an insulator.

SUMMARY OF THE INVENTION

According to embodiments of the present invention, a wildlife guard assembly for an electrical insulator body includes at least three guard members serially connected to one another such that at least one of the guard members is moveable relative to the others. Each of the guard members has a respective shell body. The guard members are selectively movable between an open position, wherein the guard members are configured to receive the insulator body, and a closed position, wherein the shell bodies of the at least three guard members collectively form an enclosure defining a chamber to receive the insulator body such that at least a portion of the insulator body is enclosed by the enclosure.

According to method embodiments of the present invention, a method for covering an electrical insulator body includes: providing a wildlife guard assembly including at least three guard members serially connected to one another such that at least one of the guard members is moveable relative to the others, wherein each of the guard members has a respective shell body; placing the guard members in an open position on the insulator body such that the insulator body is received between the guard members; and thereafter moving the guard members into a closed position, wherein the shell bodies of the at least three guard members collectively form an enclosure defining a chamber receiving the insulator body such that at least a portion of the insulator body is enclosed by the enclosure.

According to embodiments of the present invention, a modular system for forming a wildlife guard assembly for an electrical insulator body includes at least three guard members each having a shell body, and connectors associated with the guard members. The guard members are selectively connectable to one another using the connectors to form wildlife guard assemblies having different numbers of the guard members included therein and thereby different respective sizes adapted to fit electrical insulator bodies of corresponding different sizes, the guard members of each said wildlife guard assembly collectively forming an enclosure defining a chamber to receive the insulator body such that at least a portion of the insulator body is enclosed by the enclosure.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
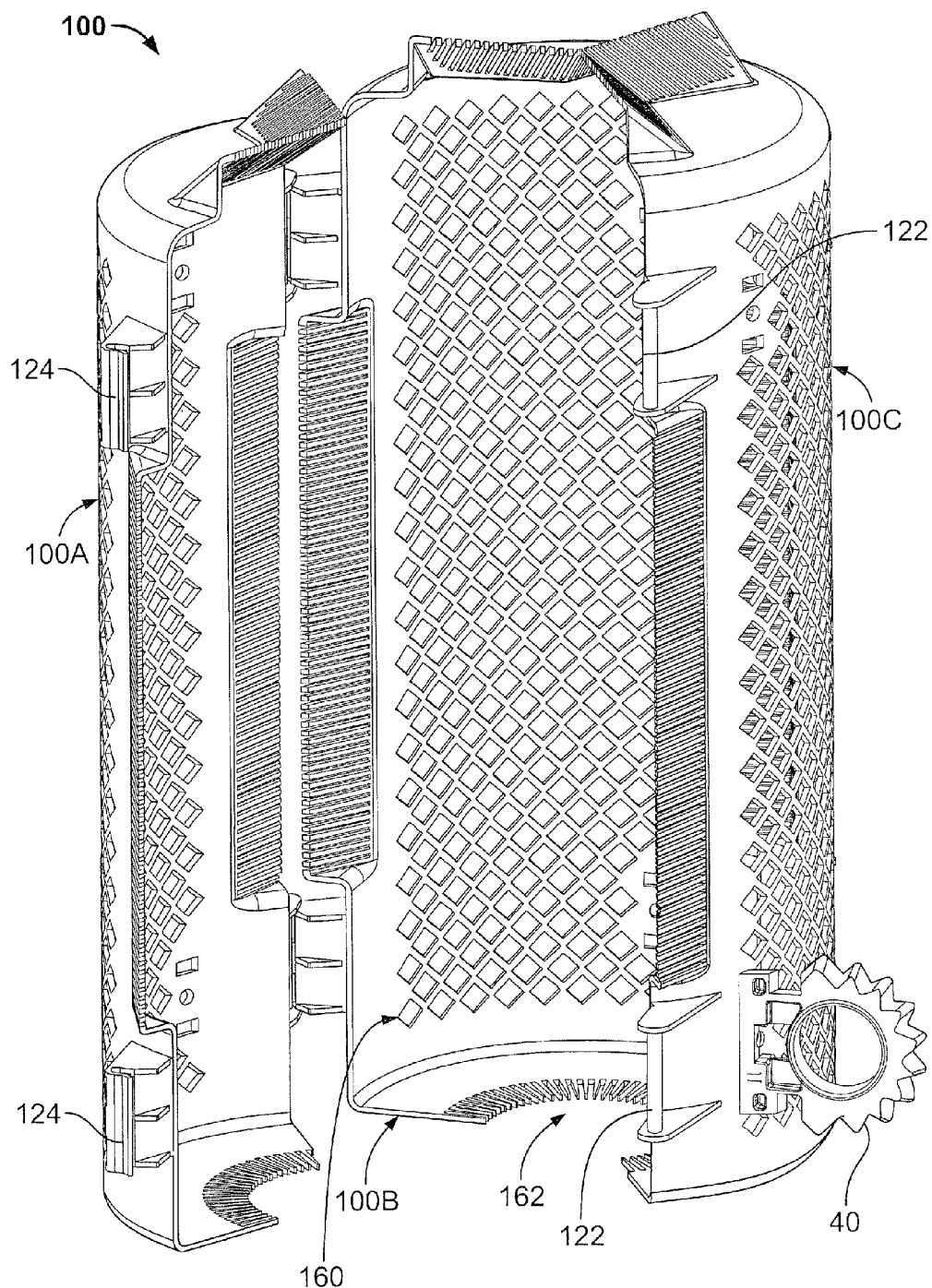
FIG. 1 is a top, front perspective view of a wildlife guard assembly according to embodiments of the present invention in an open position.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 5:
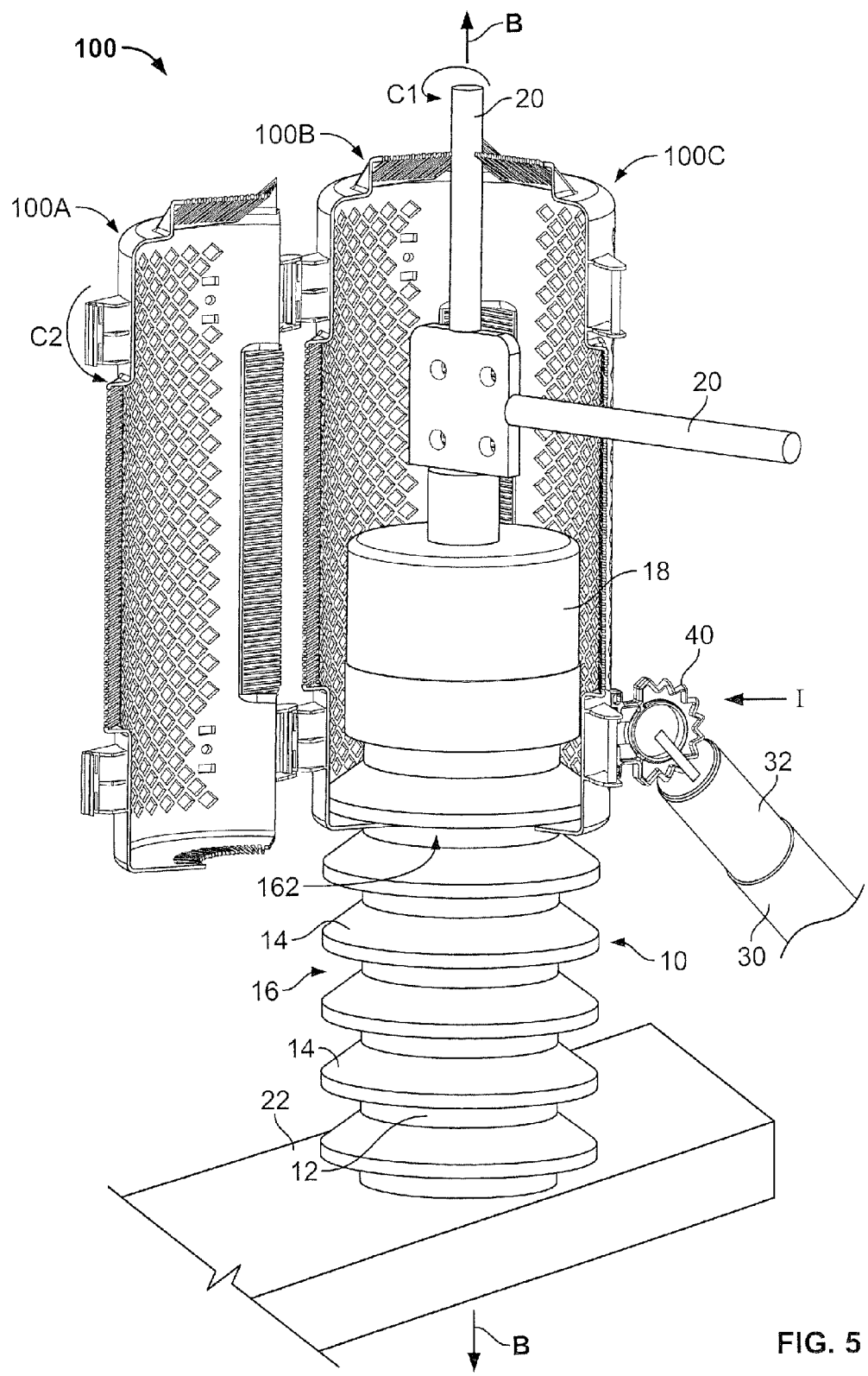
FIGS. 5 and 6 illustrate methods according to embodiments of the present invention for installing the wildlife guard assembly of FIG. 1 on an insulator bushing.
Figure 6:
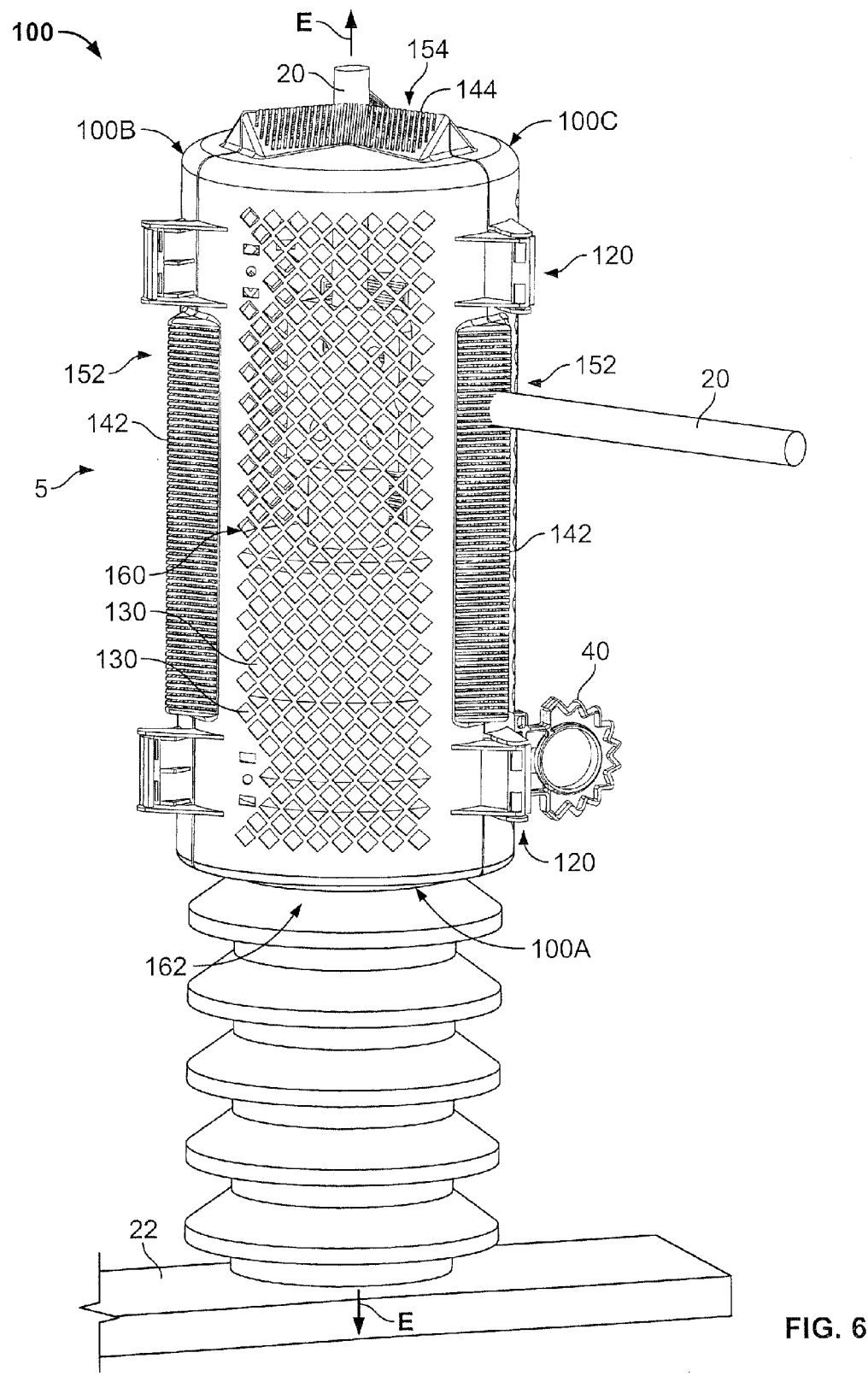

With reference to FIGS. 1-6, a wildlife guard assembly 100 according to embodiments of the present invention is shown therein. The wildlife guard assembly 100 may be used with an electrical insulator body such as an electrical insulator bushing 10 as shown in FIG. 5 to form protected electrical equipment 5 (FIG. 6). In the illustrated embodiment, an energized electrical conductor 20 extends from the bushing 10 and the bushing 10 is mounted on a support 22. The bushing 10, which is typically formed of porcelain or other electrically insulative material, electrically shields the conductor 20 from the support 22 and/or other electrically conductive components (e.g., which may be at earth potential). When installed on the bushing 10, the wildlife guard assembly 100 extends radially outwardly from the bushing 10 and serves to enlarge or extend the shortest distance between the components at significantly different electrical potential (i.e., the conductor 20 and the support 22) that can be bridged by wildlife such as squirrels or large birds. That is, the wildlife guard assembly 100 has a diameter greater than the bushing 10 so that the wildlife guard assembly 100 provides an effective barrier or obstacle to wildlife prostrating themselves from earth to high voltage.

As discussed in more detail below, the wildlife guard assembly 100 can be applied to the bushing 10 using manipulator tools (such as hotsticks or the like) while the conductor 20 is energized.

Figure 2:
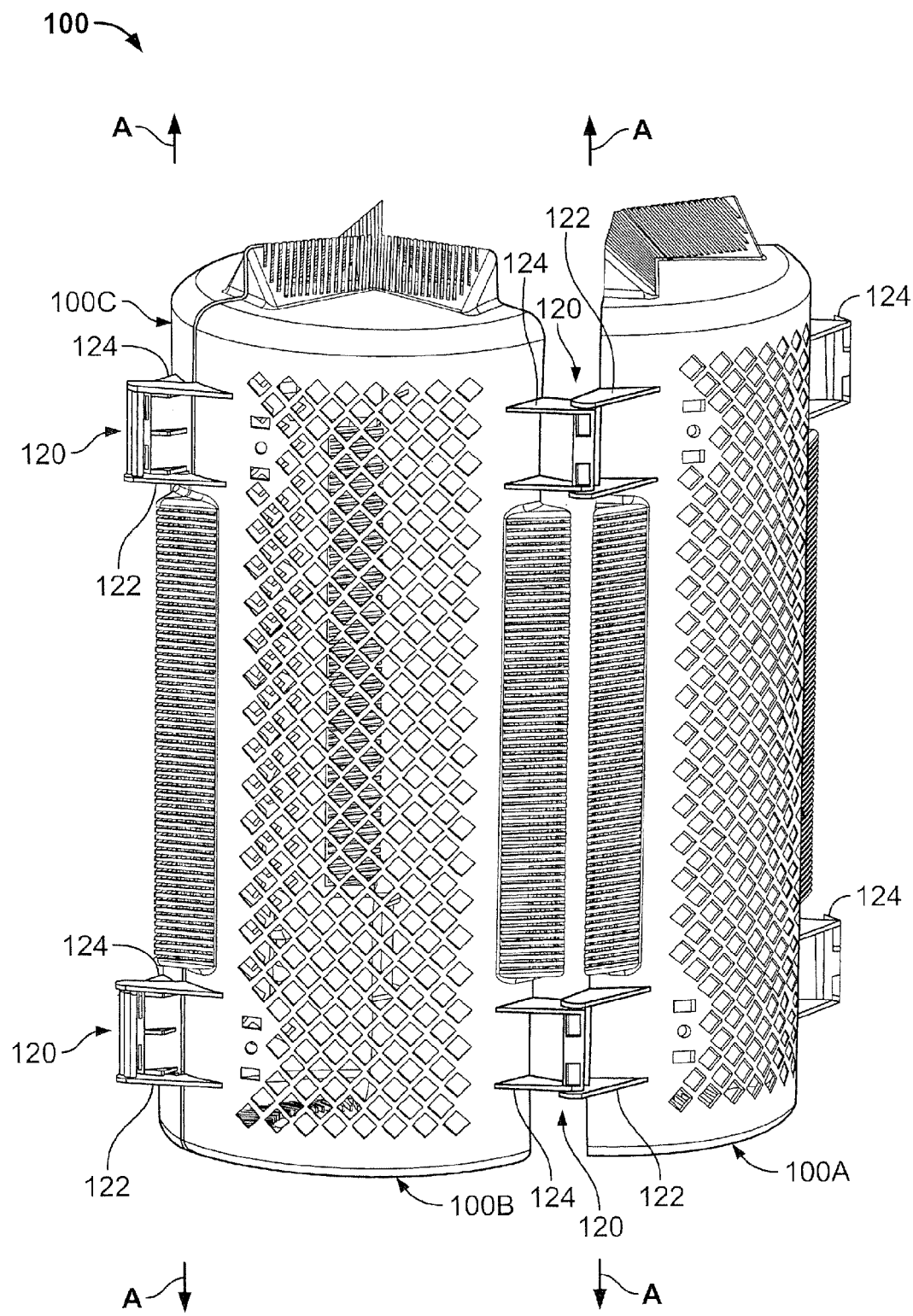
FIG. 2 is a top, rear perspective view of the wildlife guard assembly of FIG. 1 in the open position.

Turning to the wildlife guard assembly 100 in more detail and with reference to FIG. 1, the wildlife guard assembly 100 includes a first guard member 100A, a second guard member 100B and a third guard member 100C. The guard members 100A-C are serially connected or interlocked with one another to enable the guard members 100A-C to move relative to one another between an open position to receive the bushing 10 and a closed position to cover and remain securely mounted on the bushing 10. According to some embodiments and as illustrated in the drawings, the guard members 100A-C can be pivoted or rotated about hinges 120 (FIG. 2) from an open position (as shown in FIGS. 1, 2 and 5) to a closed position (as shown in FIG. 6) as discussed hereinbelow.

The guard members 100A-C may be identical to one another in certain functional aspects. According to some embodiments and as illustrated, the guard members 100A-C are substantially identical to one another in shape. The guard member 100B is exemplary and is shown in further detail in FIG. 3. The guard member 100B will be described in further detail hereinbelow; however, it will be appreciated that this description (as well as the applied reference numbers) likewise apply to the guard members 100A and 100C.

Figure 3:
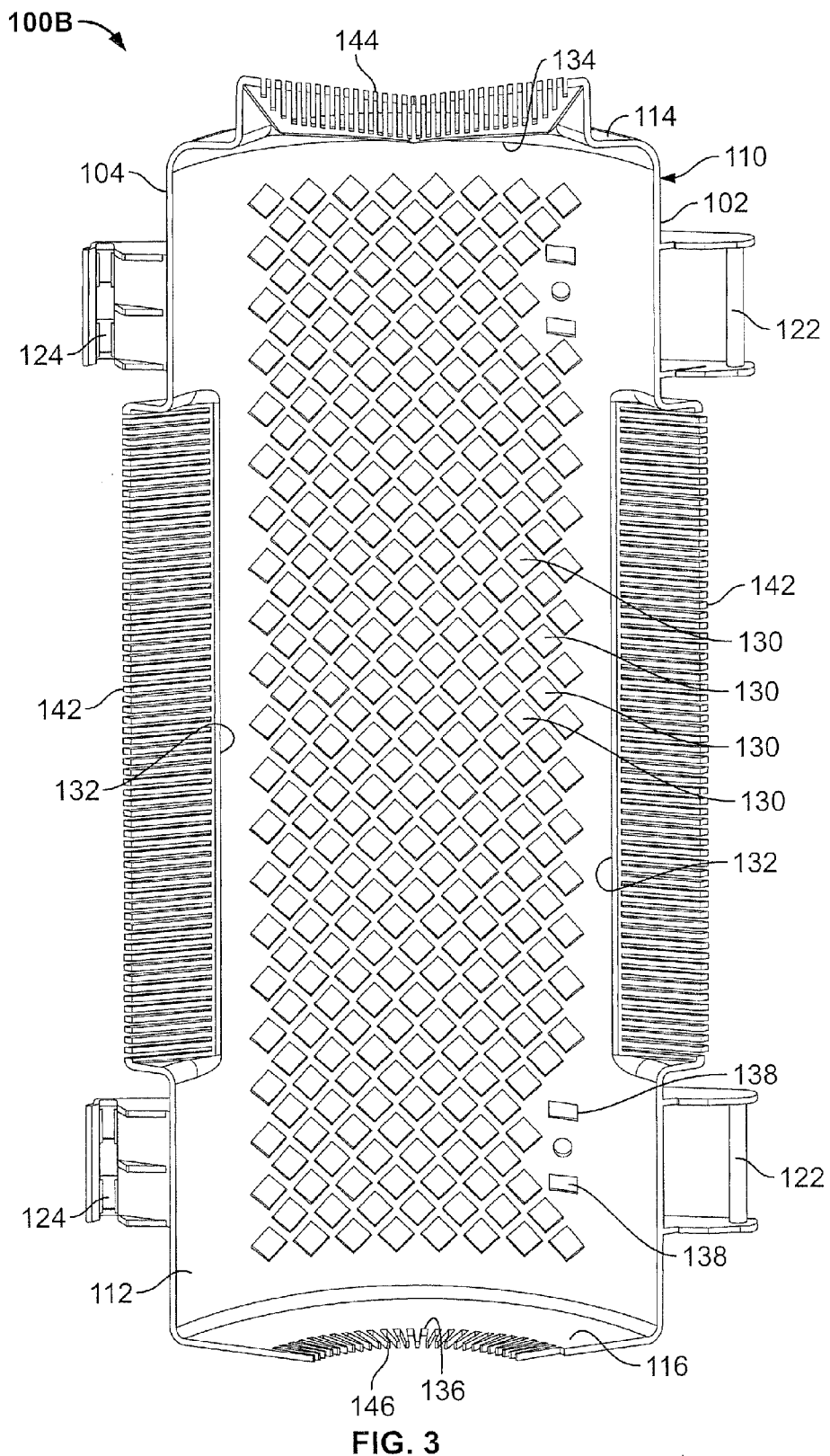
FIG. 3 is an elevational view of a guard member forming a part of the wildlife guard assembly of FIG. 1.
Figure 4:
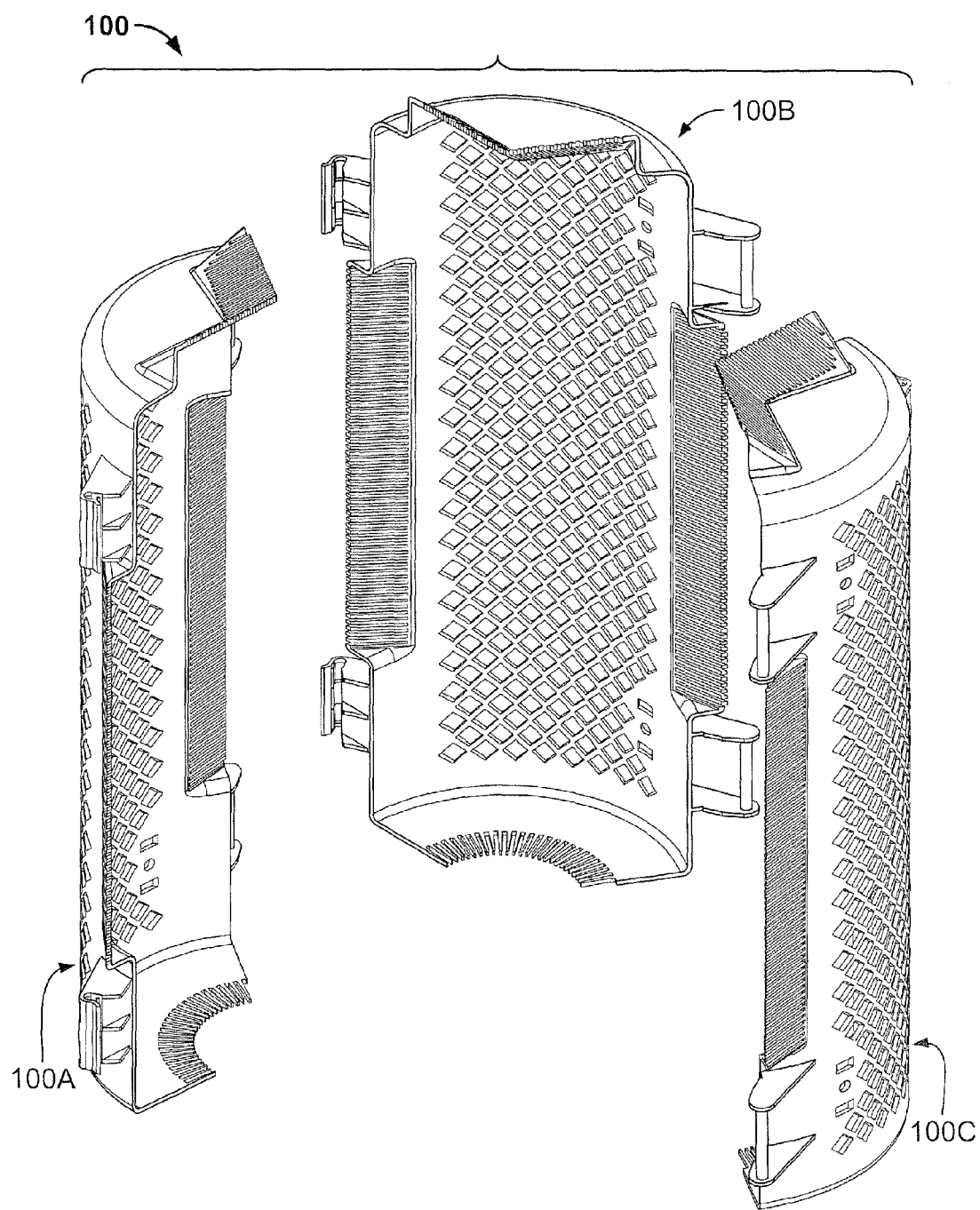
FIG. 4 is an exploded, top, front perspective view of the wildlife guard assembly of FIG. 1.

With reference to FIG. 3, the guard member 100B includes a shell body 110. The shell body 110 includes a sidewall 112, an outer wall 114 and an inner wall 116. The walls 112, 114, 116 define opposed elongated side edges 102, 104. Side notches 132 are defined in each side edge 102, 104. An outer notch 134 is defined in the outer wall 114 and an inner notch 136 is defined in the inner wall 116.

Deflectable walls 142, 144 and 146 extend across the notches 132, 134 and 136, respectively. The deflectable walls 142, 144, 146 may be frangible membranes or resilient, flexible fingers as shown, for example.

Handle mount holes 138 may be provided in the sidewall 112 or elsewhere to receive and secure a supplemental handle member 40 (FIG. 5), for example.

A plurality of window apertures or openings 130 are defined in the sidewall 112. The window openings 130 can collectively form a window for viewing the contents of the wildlife guard assembly 100 when installed. According to some embodiments, the window openings 130 cover a majority of the sidewall 112. More or fewer window openings 130 may be provided and the window openings 130 can have a different shape or shapes than that shown.

A pair of integral hinge features 122 of a first or male type extend laterally from the shell body 110 adjacent and beyond the side edge 102 and a pair of integral hinge features 124 of a second or female type extend laterally from the shell body 110 adjacent and beyond the side edge 104. The hinge features 124 are configured to snap-fit onto the hinge features 122 to cooperatively form respective ones of the hinges 120. The guard member 100B and, likewise, the guard members 100A and 100C may therefore be described as each having a hermaphroditic connectability or a hermaphroditic integral hinge connector set.

The guard members 100A-C may be formed of any suitable electrically insulative material. The material may be weather resistant. According to some embodiments, the guard members 100A-C are formed of a polymeric material. According to some embodiments, the guard members 100A-C are formed of a track resistant, insulating grade, UV stable polymer. The guard members 100A-C may be formed of the same or different materials. The guard members 100A-C may be formed of a rigid or semi-rigid material. According to some embodiments, the guard members 100A-C are each integrally formed and, according to some embodiments, each are unitarily molded (e.g., injection molded).

With reference to FIGS. 5 and 6, the wildlife guard assembly 100 may be mounted on the bushing 10 in the following manner in accordance with embodiments of the present invention.

The insulator bushing 10 (FIG. 5) is merely exemplary and includes an elongated core 12 having a core axis B-B (FIG. 5). The core 12 may be substantially cylindrical. A plurality of axially spaced apart skirts or sheds 14 extend radially outwardly from the core 12 and define slots or gaps 16 therebetween. The insulator bushing 10 includes an oil level indicator 18 (e.g., a sight glass) by which an operator can visually determine the level of oil in the bushing 10. While the insulator body is shown and described as an insulator bushing, the wildlife guard assembly 100 may be used with other types of insulator bodies such as surge arrestors, switch insulators, or support insulators.

The wildlife guard assembly 100 is assembled by connecting (e.g., by snap-fitting) the male hinge features 122 of the guard member 100B with the female hinge features 124 of the guard member 100C, and also connecting the female hinge features 124 of the guard member 100B with the male hinge features 122 of the guard member 100A. In this manner, hinges 120 are formed between the guard member 100A and the guard member 100C that securely connect the guard members 100A-C and permit adjacent ones of the guard members 100A-C to pivot with respect to one another about the axes A-A (FIG. 2) of the hinges 120. The handle member 40 is installed in the handle mount holes 138. The guard members 100A-C may be assembled in this manner in a factory, in a shop, or in the field by an installer or other technician.

As shown in FIG. 5, the wildlife guard assembly 100 may be lifted and positioned on the bushing 10 using a hotstick 30 having a selectively operable gripper mechanism 32. Suitable hotsticks may include the Model 8112 Shotgun Stick available from Hastings Fiber Glass Products, Inc. of Hastings, Mich. The installer can grip the handle member 40, lift the wildlife guard assembly 100 and laterally push (i.e., in the direction I) the inner wall 116 of the guard member 100C between the selected skirts 14 of the bushing 10.

Once the wildlife guard assembly 100 is so positioned, the guard member 100C can be held in place by the hotstick 30 while a second hotstick (e.g., operated by a second technician; not shown) is used to force the guard member 100B to rotate about the pivot axis A-A of the hinges 120 between the guard members 100B and 100C and about the core 12 in the direction C1 until the guard member 100B achieves the position of FIG. 5. The second hotstick may then be used to force the guard member 100A to rotate about the pivot axis A-A of the hinges 120 between the guard members 100B and 100A and about the core 12 in the direction C2 until the guard member 100A achieves the installed or closed position of FIG. 6 and the female hinge features 124 of the guard member 100A are connected or secured by latching or snap-fitting onto the male hinge features 122 of the guard member 100C.

In the closed position, the inner edges of the inner walls 116 collectively define a seat 162 and encircle the core 12. The inner walls 116 of the guard members 100A-C reside in the selected slot 16 between the skirts 14 to prevent vertical removal of the wildlife guard assembly 100 from the bushing 10. Alternatively, the wildlife guard assembly 100 may be installed so that it rests on the topmost skirt 14. According to some embodiments, the installed wildlife guard assembly 100 is substantially coaxial with the bushing 10. According to some embodiments, the wildlife guard assembly 100 substantially fully encircles the insulator bushing 10. The wildlife guard assembly 100 may snugly fit about the core 12. The hotstick 30 can then be removed.

The shell bodies collectively form a hollow body or enclosure defining an interior chamber 160 that contains a portion of the insulator bushing 10 and, if present, the conductor 20. The adjacent notches 132 collectively define side conductor ports 152 through which the conductor 20 may exit the chamber 160. The outer notches 134 collectively define a top or outer conductor port through which the conductor 20 may exit the chamber 160. The deflectable walls 142, 144 cover the ports 152, 154 to inhibit entry of animals, debris or the like into the chamber 160.

According to some embodiments, the inner diameter of the seat 162 when the wildlife guard assembly 100 is closed is in the range of from about 12 to 21 cm.

According to some embodiments, a modular system is provided including a plurality of guard members as described herein that can be selectively assembled or connected to one another to form wildlife guard assemblies of different sizes or configurations by incorporating more or fewer of the guard members in the assembled wildlife guard assembly. According to some embodiments, the system includes at least four such guard members so that an installer or technician can construct either the three-guard member wildlife guard assembly or a larger four-guard member wildlife guard assembly. According to some embodiments, the modular system is provided as a kit including the plurality of guard members from which the technician can select the required number of guard members for assembly. The unassembled guard members of the kit may be suitably packaged for delivery, storage and/or handling.

Figure 7:
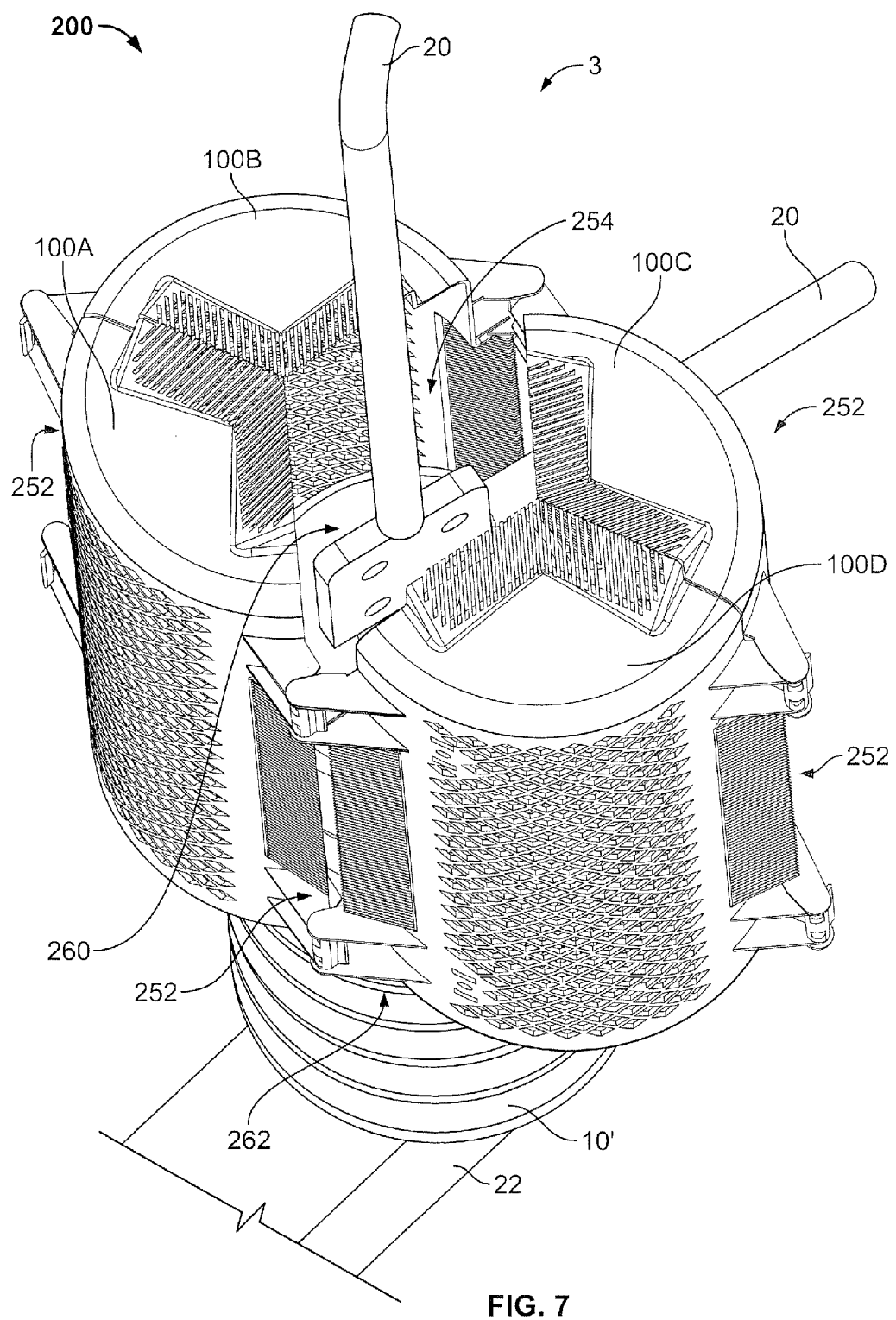
FIG. 7 is a top, front perspective view of a wildlife guard assembly according to further embodiments of the present invention installed on an insulator bushing.

An exemplary modular system 3 (FIG. 7) will now be described with reference to FIGS. 5 and 7. The modular system 3 includes at least four guard members 100A-D. The guard members 100A-C are the guard members 100A-C discussed above with reference to FIGS. 1-6 and the guard member 100D is a fourth guard member of an identical or structurally the same or compatible configuration. The modular system 3 may include a greater number of the guard members of identical or structurally the same or compatible configurations (e.g., five, six or an indefinite number of such guard members).

In use, the technician can determine the size (e.g., core or skirt diameter) of the insulator body (e.g., bushing) and, based on the determined size, select the appropriate number of the guard members 100A-D to include in the wildlife guard assembly. The modular system 3 may include a guide or instructions (e.g., provided with or packaged in the kit) that identify the number of guard members 100A-D needed for insulator bodies in different size ranges and/or of different types. Accordingly, for a bushing 10 of the size shown in FIG. 5, the technician would assemble a three-guard member wildlife guard assembly 100 (including guard members 100A-C) as discussed above with reference to FIGS. 1-6. On the other hand, if presented with a larger bushing 10' as shown in FIG. 7, the technician would assemble a four-guard member wildlife guard assembly 200 (including guard members 100A-D) as shown in FIG. 7. The guard members 100A-D are serially snap-fit connected to one another and mounted on the bushing 10' in the same manner as discussed above with regard to the wildlife guard assembly 100. The installed wildlife guard assembly 200 defines an interior chamber 260, a seat 262, four side conductor ports 252, and an outer conductor port 254.

The modular system 3 can provide improved flexibility in constructing and installing wildlife guards on insulator bodies of various different sizes. A technician can configure the wildlife guard assembly as needed and, according to some embodiments, without requiring any special tools. Because the guard members are identical or the same or compatible in functional structure (e.g., have a hermaphroditic connector configuration), the utility and the technician only need to keep one type of guard member in their field storage or inventory, thereby reducing the cost and volume of required inventory.

The window openings 130 permit a technician to conveniently visually observe the oil level as presented in the oil level indicator 18 of the bushing 10. Such functionality is desirable because an indicated oil level that is too low or too high may indicate that the dielectric function of the bushing is compromised or that a problematic condition exists in the power distribution system of the conductor 20. The window openings 130 may be unblocked or may be covered with a transparent barrier.

While the guard members 100A-D have been described herein as each movable (e.g., pivotable) relative to the other, two or more of the guard members 100A-D may be fixedly connected with at least one of the guard members 100A-D being movable relative to the others to permit insertion of the insulator body and subsequent closure thereabout.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A wildlife guard assembly for an electrical insulator body, the wildlife guard assembly comprising:
   at least three guard members serially connected to one another such that at least one of the guard members is moveable relative to the others, wherein each of the guard members has a respective shell body;
   wherein the guard members are selectively movable between an open position, wherein the guard members are configured to receive the insulator body, and a closed position, wherein the shell bodies of the at least three guard members collectively form an enclosure defining a chamber to receive the insulator body such that at least a portion of the insulator body is enclosed by the enclosure;
   wherein:
   the guard members are connected to one another by hinges that enable the guard members to pivot relative to one another between the open and closed positions;
   each of the guard members includes:
   a first integral hinge connector feature of a first type proximate a first edge thereof; and
   a second integral hinge connector feature of a second type proximate a second edge of the guard member opposite the first edge;
   and
   the first integral hinge connector feature of each guard member is cooperatively engaged with the second integral hinge connector feature of a serially adjacent one of the guard members to form one of the hinges to hingedly couple the serially adjacent guard members to one another
   and
   wherein the guard members are identical in shape.

2. The wildlife guard assembly of claim 1 wherein each of the at least three guard members is movable relative to the other guard members.

3. The wildlife guard assembly of claim 1 wherein: the insulator body includes a core and a plurality of skirts spaced apart along a length of the core, the skirts extending radially outwardly from the core; and at least one of the guard members includes an insert portion configured to be received between adjacent ones of the skirts when the guard members are in the closed position.

4. The wildlife guard assembly of claim 1 wherein each of the first integral hinge connector features is snap-fit mateable with a respective one of the second integral hinge connector features to cooperatively form a corresponding one of the hinges.

5. The wildlife guard assembly of claim 1 wherein the guard members, when in the closed position, define a conductor port between adjacent ones of the guard members to receive an electrical conductor therethrough.

6. The wildlife guard assembly of claim 5 including at least one deflectable wall covering at least a portion of the conductor port and being integrally formed with at least one of the guard members defining the conductor port.

7. The wildlife guard assembly of claim 1 wherein the guard members are configured to fully encircle the insulator body when mounted on the insulator body in the closed position.

8. The wildlife guard assembly of claim 1 wherein at least one of the guard members includes at least one opening configured and positioned to permit an operator to view an oil level indicator of the insulator body when the wildlife guard assembly is mounted on the insulator body.

9. The wildlife guard assembly of claim 1 wherein each of the guard members includes a hermaphroditic connector configuration including the first integral hinge connector feature thereof and the second integral hinge connector feature thereof.

10. A method for covering an electrical insulator body, the method comprising:
    providing a wildlife guard assembly including at least three guard members serially connected to one another such that at least one of the guard members is moveable relative to the others, wherein each of the guard members has a respective shell body;
    placing the guard members in an open position on the insulator body such that the insulator body is received between the guard members; and thereafter
    moving the guard members into a closed position, wherein the shell bodies of the at least three guard members collectively form an enclosure defining a chamber receiving the insulator body such that at least a portion of the insulator body is enclosed by the enclosure;
    wherein:
    the guard members are connectable to one another by hinges that enable the guard members to pivot relative to one another between the open and closed positions;
    each of the guard members includes:
    a first integral hinge connector feature of a first type proximate a first edge thereof; and a second integral hinge connector feature of a second type proximate a second edge of the guard member opposite the first edge; and the method includes cooperatively engaging the first integral hinge connector feature of each guard member with the second integral hinge connector feature of a serially adjacent one of the guard members to form one of the hinges to hingedly couple the serially adjacent guard members to one another and wherein the guard members are identical in shape.

11. The method of claim 10 wherein:

each of the first integral hinge connector features is snap-fit mateable with a respective one of the second integral hinge connector features; and providing the wildlife guard assembly includes snap-fitting the first integral hinge connector features together with the second integral hinge connector features of adjacent ones of the guard members to serially connect the guard members.

12. The method of claim 11 wherein moving the guard members into the closed position includes pivoting at least one of the guard members with respect to the other guard members about one of the hinges from the open position to the closed position.

13. The method of claim 10 wherein each of the guard members includes a hermaphroditic connector configuration including the first integral hinge connector feature thereof and the second integral hinge connector feature thereof.

14. A modular system for forming a wildlife guard assembly for an electrical insulator body, the modular system comprising:

at least three guard members each having a shell body; and connectors associated with the guard members;

wherein the guard members are selectively connectable to one another using the connectors to form wildlife guard assemblies having different numbers of the guard members included therein and thereby different respective sizes adapted to fit electrical insulator bodies of corresponding different sizes, the guard members of each said wildlife guard assembly collectively forming an enclosure defining a chamber to receive the insulator body such that at least a portion of the insulator body is enclosed by the enclosure;

wherein:

the guard members are connectable to one another by hinges that enable the guard members to pivot relative to one another between the open and closed positions;

each of the guard members includes:

a first integral hinge connector feature of a first type proximate a first edge thereof; and a second integral hinge connector feature of a second type proximate a second edge of the guard member opposite the first edge;

and the first integral hinge connector feature of each guard member is cooperatively engageable with the second integral hinge connector feature of a serially adjacent one of the guard members to form one of the hinges to hingedly couple the serially adjacent guard members to one another and wherein the guard members are identical in shape.

15. The system of claim 14 wherein at least one of the guard members is movable relative to the other guard members when the wildlife guard assembly is assembled.

16. The system of claim 15 wherein each of the guard members is movable relative to the other guard members when the wildlife guard assembly is assembled.

17. The system of claim 14 wherein: the insulator body includes a core and a plurality of skirts spaced apart along a length of the core, the skirts extending radially outwardly from the core; and at least one of the guard members includes an insert portion configured to be received between adjacent ones of the skirts when the wildlife guard assembly is installed on the insulator body.

18. The system of claim 14 wherein each of the guard members includes a hermaphroditic connector configuration including the first integral hinge connector feature thereof and the second integral hinge connector feature thereof.

* * * * *